United States Patent [19]

Miyazaki et al.

[11] Patent Number: 4,633,334
[45] Date of Patent: Dec. 30, 1986

[54] TRACKING CONTROL APPARATUS USING DIGITIZED VERTICAL SYNCHRONIZING SIGNAL

[75] Inventors: Ken Miyazaki, Yokohama; Shoichi Okazaki, Sagamihara, both of Japan

[73] Assignee: Victor Company of Japan, Ltd., Yokohama, Japan

[21] Appl. No.: 686,931

[22] Filed: Dec. 27, 1984

[30] Foreign Application Priority Data

Dec. 28, 1983 [JP] Japan .................. 58-247453

[51] Int. Cl.$^4$ ............ H04N 5/781; G11B 5/56; G11B 21/10
[52] U.S. Cl. ............... 360/33.1; 360/77; 360/78; 358/342
[58] Field of Search .............. 360/33.1, 35.1, 75, 360/77, 78, 97; 358/312, 324, 335, 342; 369/43, 44

[56] References Cited

U.S. PATENT DOCUMENTS

| 3,649,752 | 3/1972 | Hinjo ............... | 360/97 X |
| 3,761,604 | 9/1973 | Ozawa et al. ....... | 358/324 |
| 4,415,939 | 11/1983 | Ballard ............ | 360/75 |
| 4,485,418 | 11/1984 | Bremmer ........... | 360/77 |
| 4,499,510 | 2/1985 | Harding et al. ..... | 360/77 |
| 4,525,750 | 6/1985 | Hamalainen ........ | 360/77 X |

*Primary Examiner*—Raymond F. Cardillo
*Assistant Examiner*—Wayne R. Young
*Attorney, Agent, or Firm*—Michael N. Meller

[57] ABSTRACT

A tracking control apparatus for a disc reproducing apparatus comprises a circuit including a head for reproducing an FM video signal from a disc recorded with the FM video signal on concentric tracks or a spiral track formed on a recording surface thereof, a moving mechanism including a motor for moving the head in a radial direction of the disc, an extracting circuit for extracting a vertical blanking period portion of the reproduced FM video signal, a circuit for sampling and holding a D.C. level of the vertical blanking period portion and for obtaining a digital value indicative of the sampled and held D.C. level, a memory for storing the digital value, and a control circuit for controlling a write-in and a read-out with respect to the memory. The control circuit supplies a control signal to the moving mechanism to move the head to a plurality of positions which are mutually separated by predetermined minute quantities with respect to one track pitch and writes a plurality of digital values into the memory which plurality of digital values are obtained when the head assumes the plurality of positions. The control circuit obtains a maximum digital value from among the plurality of digital values stored in the memory and supplies to the moving mechanism a control signal for moving the head to a position where the maximum digital value is obtainable.

9 Claims, 10 Drawing Figures

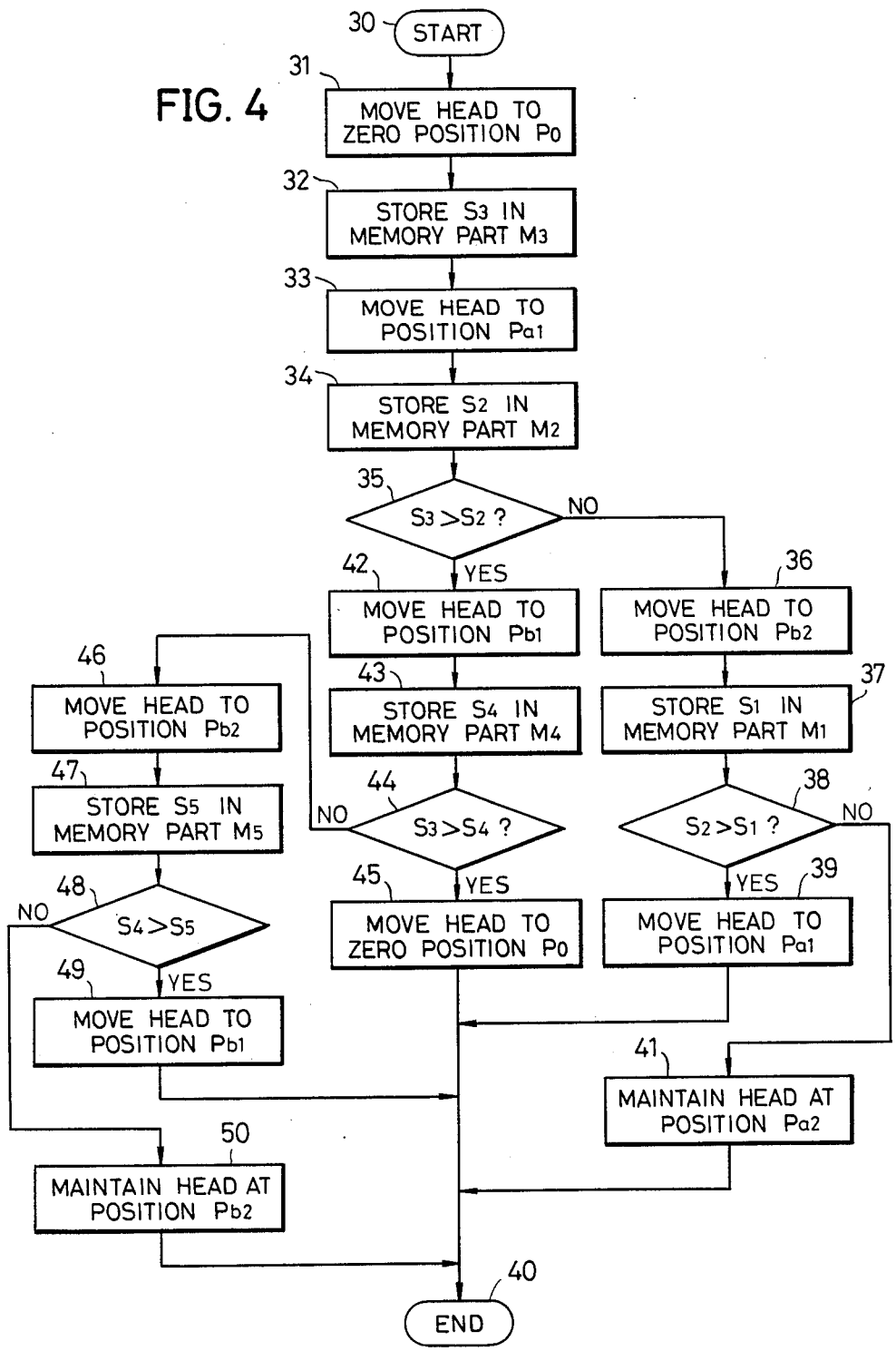

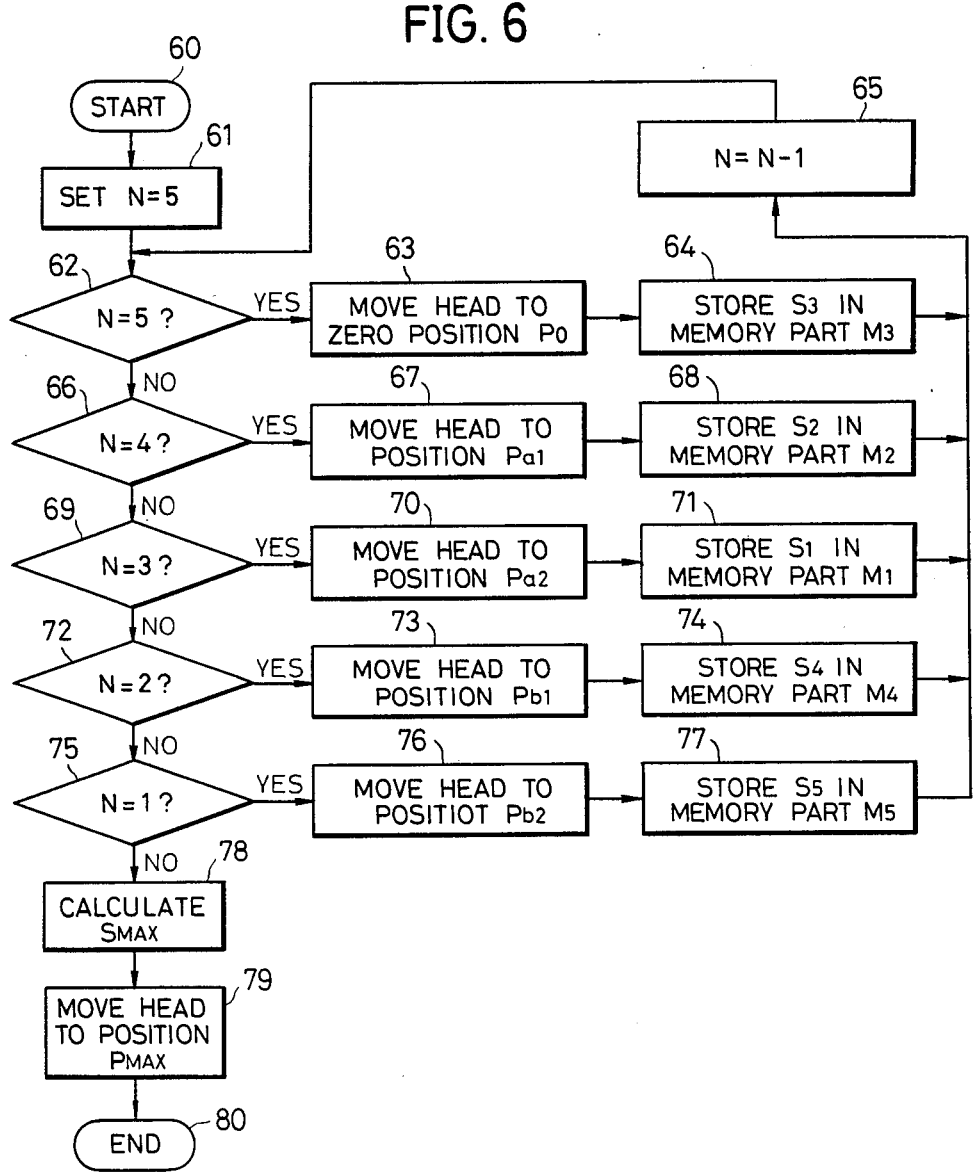

TRACKING CONTROL APPARATUS USING DIGITIZED VERTICAL SYNCHRONIZING SIGNAL

BACKGROUND OF THE INVENTION

The present invention generally relates to tracking control apparatuses for rotary recording medium reproducing apparatuses, and more particularly to a tracking control apparatus which controls the tracking of a reproducing transducer element of a reproducing apparatus so that the reproducing transducer element accurately scans over a recorded track on a rotary recording medium which is played on the reproducing apparatus.

Conventionally, there is an apparatus reduced to practice in which video signals, for example, are recorded on concentric tracks on upper and lower recording surfaces of a rotary recording medium (hereinafter simply referred to as a disc) such as a magnetic disc. According to this apparatus, a pair of magnetic heads make contact with the respective upper and lower recording surfaces of the disc, and the video signals are recorded on the concentric tracks by alternately and intermittently moving the magnetic heads. In this type of an apparatus, a first head records a video signal of one field in one track turn on a first side of the disc while the disc rotates and the first head is stationary. Then, the first head is moved by two track pitches, and the stationary first head records in one track turn on the first side of the disc a video signal of one field which is obtained an interval of one field later. Thereafter, the first head is intermittently moved for every two track pitches and records the video signal of every other field in one track turn on the first side of the disc while the first head is stationary. Similarly, a second head records a video signal of one field in one track turn on a second side of the disc while the disc rotates and the second head is stationary. Then, the second head is moved by two track pitches, and the stationary second head records in one track turn on the second side of the disc a video signal of one field which is obtained an interval of one field later. Thereafter, the second head is intermittently moved for every two track pitches and records the video signal of every other field in one track turn on the second side of the disc while the second head is stationary. The second head records the video signals of those fields which are not recorded by the first head. Accordingly, the video signal is recorded in its entirety by the first and second heads which alternately record the video signal on the respective first and second sides of the disc. When the first and second heads intermittently move by two track pitches from respective outer peripheral positions and reach respective inner peripheral positions, the first and second heads move toward the respective outer peripheral positions by one track pitch and thereafter move intermittently at a rate of two track pitches. Hence, as the first and second heads move from the inner peripheral positions toward the outer peripheral positions, tracks are formed between the tracks which were formed as the first and second heads moved from the outer peripheral positions toward the inner peripheral positions. A recording and reproducing apparatus of this type is disclosed in U.S. Pat. Nos. 3,649,752 and 3,761,604, for example.

In the type of the recording and reproducing apparatus disclosed in the U.S. patents described above, each head is stationary and repeatedly scans over the same track turn during a still-picture reproduction mode. In this still-picture reproduction mode, the head position does not necessarily correspond accurately to the recorded track due to various causes such as contraction and expansion of the disc, mechanical precision of means for moving the head, and backlash of gears. When the head position is deviated from the recorded track in the radial direction of the disc, the width with which the head scans over the recorded track decreased and the level of the reproduced signal accordingly decreases. Hence, it is necessary to carry out a tracking control so as to correct the position of each stationary head so that each head accurately scans over the recorded track.

Conventionally, in order to carry out the tracking control during a reproducing mode of the recording and reproducing apparatus of the type described before so that each head accurately scans over the recorded track, a control signal for tracking control is recorded, at the time of the recording, beside the recorded track which is recorded with the video signal. During the reproducing mode, the control signal is reproduced and is supplied to a tracking control circuit of a tracking control apparatus which controls the head position so that each head accurately scans over the recorded track.

However, according to the conventional tracking control apparatus, heads exclusively for recording and reproducing the control signal and a circuit for processing the control signal must be provided in addition to the heads which record and reproduce the video signal. As a result, the construction of the recording and reproducing apparatus becomes complex, and the manufacturing cost of the recording and reproducing apparatus becomes high. In addition, because it is necessary to provide tracks for the control signal in addition to the tracks provided for the video signal, the recording density (recording surface utilization efficiency) of the disc with respect to the video signal is poor.

SUMMARY OF THE INVENTION

Accordingly, it is a general object of the present invention to provide a novel and useful tracking control apparatus for a disc reproducing apparatus in which the problems described heretofore are eliminated. In the present specification, the term "disc reproducing apparatus" is intended to include in its scope a disc recording and reproducing apparatus.

Another and more specific object of the present invention is to provide a tracking control apparatus for a disc reproducing apparatus, in which the level of a video signal reproduced from a recorded track on a disc is detected and the head position is controlled so that the level of the reproduced video signal assumes a maximum. According to the tracking control apparatus of the present invention, it is unnecessary to provide a head exclusively for recording and reproducing a control signal for tracking control as is required in the conventional apparatus described before. As a result, the construction of the tracking control apparatus according to the present invention is simple, and the manufacturing cost of the tracking control apparatus is low. In addition, since it is unnecessary to provide a track for the control signal as is required in the conventional apparatus described before, the recording density (recording surface utilization efficiency) of the disc with respect to the video signal is high.

Still another object of the present invention is to provide a tracking control apparatus in which a head is moved in minute quantitites in the radial direction of the disc to a plurality of positions, and the level of the video signal reproduced at each position of the head is stored. The stored levels are compared so as to determine a maximum level, and the head is moved to a position where this maximum level is obtainable.

Other objects and further features of the present invention will be apparent from the following detailed description when read in conjunction with the accompanying drawings.

BRIEF DESCRIPTION OF THE DRAWINGS

FIG. 4 is a flow chart for explaining an embodiment of the operation of a central processing unit in the block system shown in FIG. 1;

FIG. 6 is a flow chart for explaining another embodiment of the operation of the central processing unit in the block system shown in FIG. 1.

DETAILED DESCRIPTION

Figure 1:
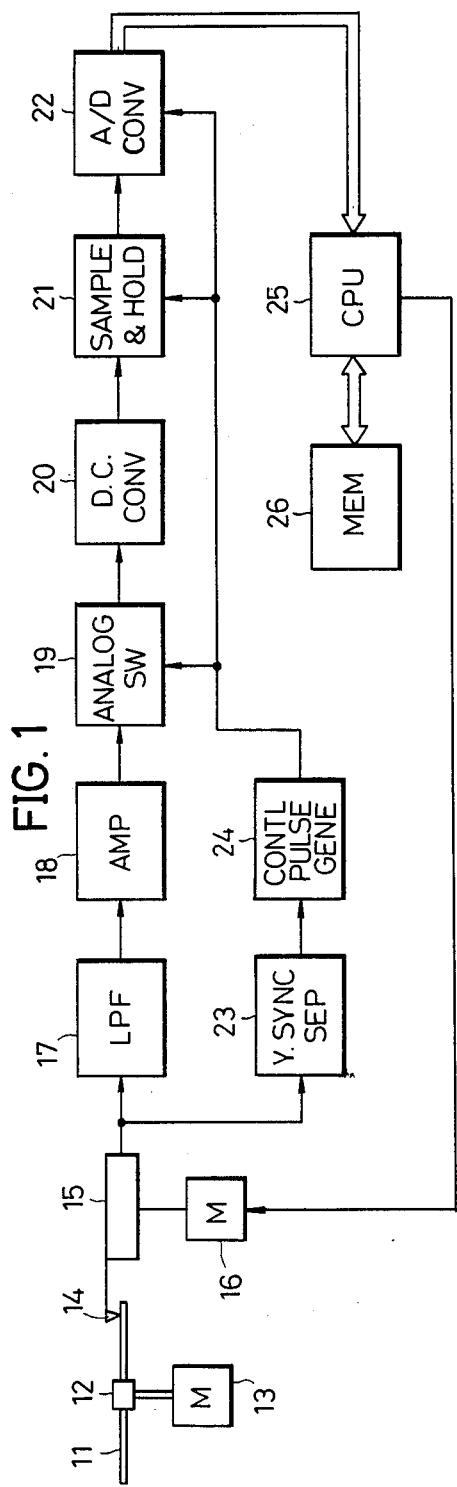
FIG. 1 is a systematic block diagram showing an embodiment of the tracking control apparatus according to the present invention.

FIG. 1 shows an embodiment of the tracking control apparatus according to the present invention. In the present embodiment, it will be assumed for convenience' sake that only one recording surface of a magnetic disc is played at one time. In FIG. 1, a magnetic disc 11 is recorded with information signals which are frequency modulated, such as a frequency modulated (FM) video signal, on concentric tracks which are formed on the recording surface of the disc 11. No control signal for tracking control is recorded on the disc 11. In the present embodiment, the FM video signal is recorded on the disc 11 at a rate of one field per track turn, for example. The disc 11 is clamped by a clamper 12, and is rotated at a rotational speed of 3,600 rpm, for example, by a motor 13 which rotates the clamper 12.

The FM video signal recorded on the disc 11 is reproduced by a magnetic head 14. The head 14 is movable in the radial direction of the disc 11 by a head moving mechanism 15 which is driven by a step motor 16. For example, in a normal reproducing mode, the head 14 is moved over a predetermined distance in the radial direction of the disc 11 by the head moving mechanism 15 every time the head 14 completes scanning over one track turn of the disc 11. On the other hand, in a still-picture reproduction mode, the head 14 does not move and is stationary. Hence, in the still-picture reproduction mode, the head 14 repeatedly scans over the same track turn of the disc 11.

Figure 2:
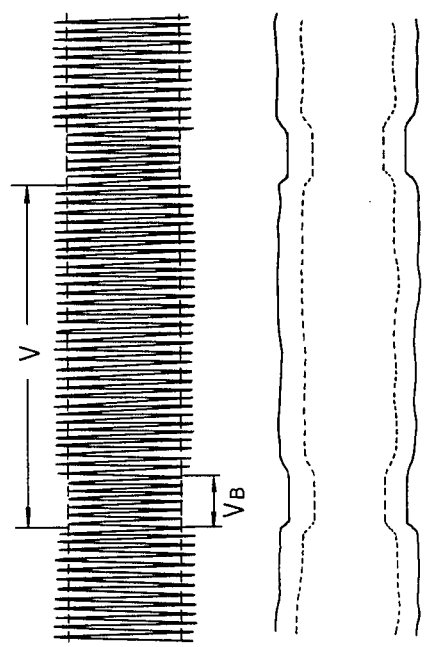
FIG. 2(A) shows the waveform of a frequency modulated signal reproduced from a disc.
FIG. 2(B) shows an envelope of the reproduced frequency modulated signal shown in FIG. 2(A) and an envelope of a reproduced frequency modulated signal which is obtained when a tracking error occurs.

FIG. 2(A) shows the waveform of the FM signal which is reproduced from the disc 11 by the head 14. In FIG. 2(A), the vertical scanning period of the reproduced FM video signal is represented by V, and the vertical blanking period is represented by $V_B$. In a case where the video signal is of the NTSC system, the vertical scanning period V is approximately equal to 16.7 msec. Because no video information is transmitted in the vertical blanking period $V_B$, the frequency of the reproduced FM video signal is approximately constant within the vertical blanking period $V_B$. In addition, the level of the reproduced FM video signal is stable within the vertical blanking period $V_B$ compared to the level of the reproduced FM video signal in other parts of the vertical scanning period V.

Figure 3A:
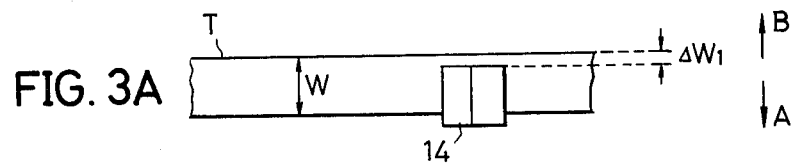
FIGS. 3A and 3B respectively are diagrams for explaining the tracking error of a magnetic head.
Figure 3B:
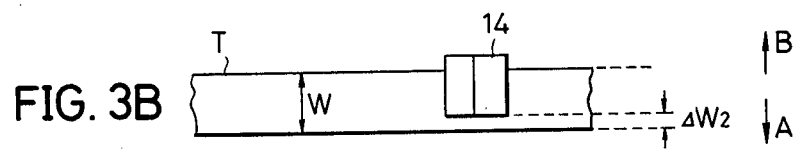

FIGS. 3A and 3B each show a case where a tracking error occurs and the head 14 is deviated with respect to a track which is to be scanned. In FIG. 3A, an arbitrary track T on the disc 11 has a track width W. In a state where the head 14 is in a correct position and the tracking error is zero, the head 14 scans over the full width W of the track T and an envelope of the reproduced FM signal which is obtained from the head 14 becomes as indicated by a solid line in FIG. 2(B). In other words, a maximum output can be obtained when the tracking error is zero. However, when the head 14 deviates from the correct position by a quantity $\Delta W_1$ in an inner peripheral direction A of the disc 11 due to some cause as shown in FIG. 3A, the head 14 can only scan over a width $(W - \Delta W_1)$ of the track T. When the head 14 deviates from the correct position in this manner, the level of the reproduced FM video signal obtained from the head 14 decreases and the envelope of the reproduced FM video signal becomes as indicated by a phantom line in FIG. 2(B).

Similarly, when the head 14 deviates from the correct position by a quantity $\Delta W_2$ in an outer peripheral direction B of the disc 11 due to some cause as shown in FIG. 3B, the head 14 can only scan over a width $(W - \Delta W_2)$ of the track T. Hence, the level of the reproduced FM video signal obtained from the head 14 decreases and the envelope of the reproduced FM video signal becomes similar to that indicated by the phantom line in FIG. 2(B).

Returning now to the description of the block system shown in FIG. 1, the reproduced FM video signal obtained from the head 14 is passed through a lowpass filter 17 and an amplifier 18, and is supplied to an analog switch 19. On the other hand, the reproduced FM video signal obtained from the head 14 is also supplied to a vertical synchronizing signal separating circuit 23. A vertical synchronizing signal which is separated from the reproduced FM video signal in the separating circuit 23, is supplied to a control pulse generating circuit 24. The control pulse generating circuit 24 generates control pulses responsive to the output vertical synchronizing signal of the separating circuit 23, and supplies the control pulses to the analog switch 19, a sample and hold circuit 21, and an analog-to-digital (A/D) converter 22. The sample and hold circuit 21 and the A/D converter 22 will be described hereinafter.

The analog switch 19 passes only the vertical blanking period portion of the reproduced FM video signal obtained from the amplifier 18, responsive to the output control pulse of the control pulse generating circuit 24. The output signal of the analog switch 19 corresponding to the vertical blanking period portion of the reproduced FM video signal, is supplied to a D.C. converter 20 wherein the signal is converted into a signal having a D.C. level. The output signal of the D.C. converter 20 is supplied to the sample and hold circuit 21 which samples and holds the D.C. level of the output signal of the D.C. converter 20 by the output control pulse of the control pulse generating circuit 24. An output signal of the sample and hold circuit 21 indicative of the sampled and held D.C. level, is supplied to the A/D converter 22 and is subjected to an analog-to-digital conversion. The A/D converter 22 produces a digital signal (digital value) indicating the sampled and held D.C. level, and this digital value is supplied to a central processing unit (CPU) 25. For example, a circuit ADC0804LCN manufactured by National Semiconductor of the United States may be used for the A/D converter 22.

Next, a description will be given with respect to an embodiment of the operation of the CPU 25 by referring to the flow chart shown in FIG. 4. In FIG. 4, the operation of the CPU 25 starts from a step 30, and the mechanical position of the head 14 is set to a zero position (or mechanically neutral position) $P_0$ in a step 31 by supplying a control signal to the motor 16. When the head 14 assumes the zero position $P_0$, the center line of the head 14 with respect to the scanning width thereof does not necessarily coincide with the center line of the track T with respect to the track width W. In actual practice, the center line of the head 14 is slightly deviated from the center line of the track T as indicated by a solid line in FIG. 5A. In FIG. 5A and FIGS. 5B through 5D which will be described hereinafter, the center line of the head 14 which assumes the zero position $P_0$ is indicated by a one-dot chain line, and the center line of the head 14 which assumes a position deviated from the zero position $P_0$ is indicated by a two-dot chain line. In FIGS. 5A through 5D, the position of the head 14 is shown by taking the center line of the head 14 as a reference.

In a step 32, a digital value $S_3$ which is obtained by passing the reproduced FM video signal from the head 14 which assumes the zero position $P_0$ through the circuits 17 through 22, is stored into a memory part $M_3$ of the memory 26. Next, a step 33 supplies a control signal to the motor 16 so as to move the head 14 toward the inner peripheral direction A of the disc 11 from the zero position $P_0$ to a position $P_{a1}$ indicated by a phantom line in FIG. 5A. The position $P_{a1}$ is separated from the zero position $P_0$ by a predetermined minute quantity. In a step 34, a digital value $S_2$ which is obtained by passing the reproduced FM video signal from the head 14 which assumes the position $P_{a1}$ through the circuits 17 through 22, is stored into a memory part $M_2$ of the memory 26. Then, a step 35 discriminates whether the digital value $S_3$ stored in the memory part $M_3$ of the memory 26 is greater than the digital value $S_2$ stored in the memory part $M_2$.

Figure 5A:
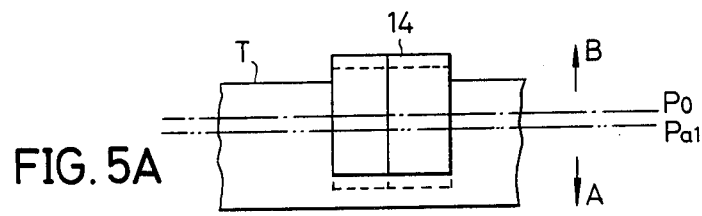
FIGS. 5A through 5D respectively show the magnetic head and a track in an enlarged scale, for explaining the operation of the tracking control apparatus according to the present invention.
Figure 5B:
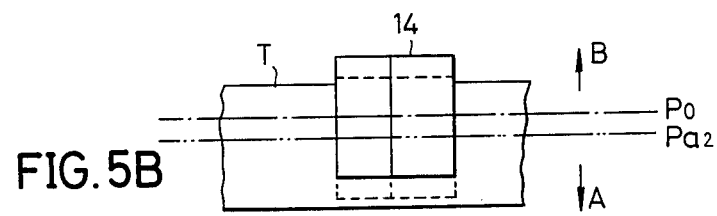
Figure 5C:
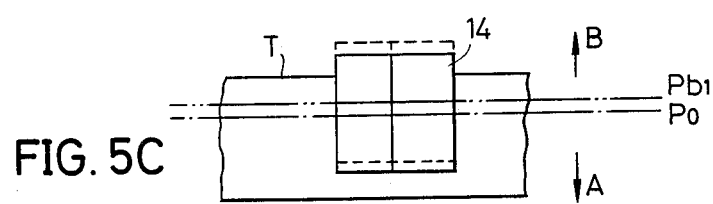

In a case where the discrimination result in the step 35 is NO, a step 36 supplies a control signal to the motor 16 so as to move the head 14 toward the inner peripheral direction A of the disc 11 from the position $P_{a1}$ to a position $P_{a2}$ indicated by a phantom line in FIG. 5B. The position $P_{a2}$ is separated from the position $P_{a1}$ by a predetermined minute quantity. In a step 37, a digital value $S_1$ which is obtained by passing the reproduced FM video signal from the head 14 which assumes the position $P_{a2}$ through the circuits 17 through 22, is stored into a memory part $M_1$ of the memory 26. Then, a step 38 discriminates whether the digital value $S_2$ stored in the memory part $M_2$ of the memory 26 is greater than the digital value $S_1$ stored in the memory part $M_1$. In a case where the discrimination result in the step 38 is YES, it is discriminated that the digital value $S_2$ is the maximum digital value. In other words, it is discriminated that a maximum output level is obtained when the head 14 assumes the position $P_{a1}$. In this case, a step 39 supplies a control signal to the motor 16 so as to move the head 14 back to the position $P_{a1}$, and the tracking control operation is ended in a step 40. On the other hand, in a case where the discrimination result in the step 38 is NO, it is discriminated that the digital value $S_1$ is the maximum digital value, that is, it is discriminated that the maximum output level is obtained when the head 14 assumes the position $P_{a2}$. Hence, when the discrimination result in the step 38 is NO, a step 41 maintains the head 14 at the position $P_{a2}$, and the tracking control operation is ended in the step 40.

The CPU 25 operates similarly when the discrimination result in the step 35 is YES. In this case, a step 42 moves the head 14 toward the outer peripheral direction B of the disc 11 from the position $P_{a1}$ to a position $P_{b1}$ indicated by a phantom line in FIG. 5C. The position $P_{b1}$ is separated from the zero position $P_0$ by a predetermined minute quantity. In a step 43, a digital value $S_4$ which is obtained by passing the reproduced FM video signal from the head 14 which assumes the position $P_{b1}$ through the circuits 17 through 22, is stored into a memory part $M_4$ of the memory 26. Then, a step 44 discriminates whether the digital value $S_3$ stored in the memory part $M_3$ of the memory 26 is greater than the digital value $S_4$ stored in the memory part $M_4$. In a case where the discrimination result in the step 44 is YES, it is discriminated that the digital value $S_3$ is the maximum digital value, that is, it is discriminated that the maximum output level is obtained when the head 14 assumes the zero position $P_0$. In this case, a step 45 supplies a control signal to the motor 16 so as to move the head 14 back to the zero position $P_0$, and the tracking control operation is ended in the step 40.

Figure 5D:
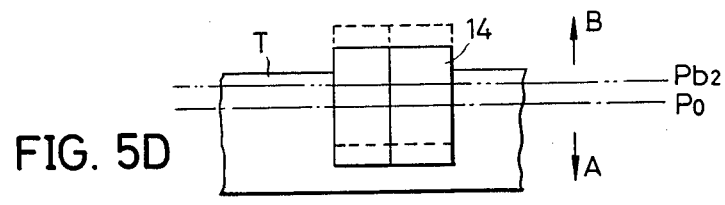

In a case where the discrimination result in the step 44 is NO, a step 46 supplies a control signal to the motor 16 so as to move the head 14 in the outer peripheral direction B of the disc 11 from the position $P_{b1}$ to a position $P_{b2}$ indicated by a phantom line in FIG. 5D. The position $P_{b2}$ is separated from the position $P_{b1}$ by a predetermined minute quantity. In a step 47, a digital value $S_5$ which is obtained by passing the reproduced FM video signal from the head 14 which assumes the position $P_{b2}$ through the circuits 17 through 22, is stored into a memory part $M_5$ of the memory 26. Then, a step 48 discriminates whether the digital value $S_4$ stored in the memory part $M_4$ of the memory 26 is greater than the digital value $S_5$ stored in the memory part $M_5$. In a case where the discrimination result in the step 48 is YES, it is discriminated that the digital value $S_4$ is the maximum digital value, that is, it is discriminated that the maximum output level is obtained when the head 14 assumes the position $P_{b1}$. In this case, a step 49 supplies a control signal to the motor 16 so as to move the head 14 back to the position $P_{b1}$, and the tracking control operation is ended in the step 40. On the other hand, in a case where the discrimination result in the step 48 is NO, it is discriminated that the digital value $S_5$ is the maximum digital value, that is, it is discriminated that the maximum output level is obtained when the head 14 assumes the position $P_{b2}$. Accordingly, when the discrimination result in the step 48 is NO, a step 50 maintains the head 14 at the position $P_{b2}$, and the tracking control operation is ended in the step 40.

In the flow chart shown in FIG. 4, the head 14 is first moved toward the inner peripheral direction A of the disc 11 from the zero positon $P_0$. However, it is possible to first move the head 14 toward the outer peripheral direction B of the disc 11 from the zero position $P_0$.

For example, the concentric tracks are formed on the recording surface of the disc 11 which a track pitch of 100 μm, and a guard band having a width of 30 μm is provided between two adjacent concentric tracks. In this case, the predetermined minute quantity (distance) between the position $P_0$ and $P_{a1}$ (or $P_{b1}$), and the predetermined minute quantity (distance) between the positions $P_{a1}$ (or $P_{b1}$) and $P_{a2}$ (or $P_{b2}$), are in the range of 3 μm to 6 μm, for example. In other words, the head position where the maximum output level is obtainable is obtained by moving the head 14 in minute steps of 3 μm to 6 μm.

Next, a description will be given with respect to another embodiment of the operation of the CPU 25 by referring to the flow chart shown in FIG. 6. In FIG. 6, the operation of the CPU 25 starts from a step 60, and a step 61 sets a variable integer N to 5. A step 62 discriminates whether N is equal to 5. When the discrimination result in the step 62 is YES, a step 63 sets the head 14 to the zero position $P_0$. In a step 64, the digital value $S_3$ which is obtained by passing the reproduced FM video signal from the head 14 which assumes the zero position $P_0$ through the circuits 17 through 22, is stored into the memory part $M_3$ of the memory 26. A step 65 counts down the value of N by one, and the operation of the CPU 25 is returned to the step 62. Similarly thereafter, the digital values $S_2$, $S_1$, $S_4$, and $S_5$ which are respectively obtained by passing the reproduced FM video signal from the head 14 which assumes the positions $P_{a1}$, $P_{a2}$, $P_{b1}$, and $P_{b2}$ through the circuits 17 through 22, are stored into the respective memory parts $M_2$, $M_1$, $M_4$, and $M_5$ of the memory 26 in the steps 62 and 65 through 77.

When all of the digital values $S_1$ through $S_5$ are stored in the memory 26 and the discrimination result in the step 75 becomes NO, a step 78 obtains a maximum digital value $S_{max}$ from among the digital values $S_1$ through $S_5$ which are stored in the memory 26. For example, in a case where the head 14 assumes the zero position $P_0$ indicated by the solid line in FIGS. 5A through 5D, the maximum digital value $S_{max}$ is the digital value $S_1$ which is obtained when the head 14 assumes the position $P_{a2}$ shown in FIG. 5B. A step 79 supplies a control signal to the motor 16 responsive to the maximum digital value $S_{max}$ obtained in the step 78, so as to move the head 14 to a position where the maximum digital value $S_{max}$ is obtainable. Accordingly, in the case where the digital value $S_1$ is the maximum digital value $S_{max}$, the head 14 is moved to the position $P_{a2}$ in the step 79. The tracking control operation is ended in a step 80.

In the flow chart shown in FIG. 6, the digital values $S_3$, $S_2$, $S_1$, $S_4$, and $S_5$ are stored into the respective memory parts of the memory 26 in this sequence. However, the sequence with which the digital values $S_1$ through $S_5$ are stored into the memory parts of the memory 26 is not limited to that shown in FIG. 6, and the same results can be obtained as long as all of the digital values $S_1$ through $S_5$ are stored into the respective memory parts of the memory 26.

In the block system shown in FIG. 1, it is assumed for convenience' sake that only one recording surface of the disc is played at one time. However, as described in the introductory part of the specification, the reproducing apparatus generally comprises a first head of a first channel for scanning over a first recording surface (side one) of the disc and a second head of a second channel for scanning over a second recording surface (side two) of the disc. Accordingly, if it is assumed that FIG. 1 shows the circuit system provided with respect to the first channel, a circuit similar to the circuit system shown in FIG. 1 is actually provided with respect to the second channel. Further, it is necessary to provide a switching circuit for selectively switching the output of the circuit system provided with respect to the first channel and the output of the circuit system provided with respect to the second channel. This is because the first and second heads alternately carry out the reproduction.

In the embodiment described in conjunction with FIG. 6, five digital values which are obtained when the head 14 assumes five different positions are stored into the memory parts of the memory 26. However, the number of digital values stored in the memory 26 for the purpose of obtaining the maximum digital value, is not limited to five and the number of digital values stored in the memory 26 may be greater than or less than five.

In addition, it is assumed in the embodiments described heretofore that the FM video signal is recorded on concentric tracks formed on the recording surface of the disc 11. However, the tracking control apparatus according to the present invention may also be applied to a disc reproducing apparatus which is designed to play a disc having the FM video signal recorded on a spiral track thereof. In this case, the radius of the spiral track continuously changes in the radial direction of the disc, and the tracking control operation must be carried out by taking into consideration the continuous change in the radius of the spiral track. Accordingly, a compensation signal indicative of the continuous change in the radius of the spiral track may be stored in the memory 26, and the tracking control operation may be carried out responsive to this compensation signal.

When the FM video signal is recorded on the disc 11 at the rate of one field per track turn and the disc 11 is rotated at the rotational speed of 3,600 rpm as described before, a digital value is produced from the A/D converter 22 for each track turn of the disc 11. Hence, in a case where the discrimination results in the steps 35 and 44 shown in FIG. 4 are both YES in the still-picture reproduction mode, for example, the tracking control operation is completed in four track turns from the time when the head 14 is set to the zero position $P_0$. Since it takes 1/60 seconds to scan over one track turn, it takes 4/60 seconds (or approximately 0.067 seconds) for the tracking control to be completed. However, even if the level of the reproduced FM video signal changes slightly while the tracking control is carried out during this time of 0.067 seconds, such a slight change in the level of the reproduced FM video signal cannot be visually detected from the reproduced still picture by the human eye. Therefore, no problems are introduced from the practical point of view, and a stable and satisfactory reproduced still picture is obtained from the FM video signal which is repeatedly reproduced from the same track turn by the head 14. Similarly, in the case of the flow chart shown in FIG. 6, the head 14 must scan over five track turns until the discrimination result in the step 75 becomes NO, and the tracking control operation is completed in the five track turns from the time when the head 14 is set to the zero position $P_0$. In this case, it takes 5/60 seconds (or approximately 0.083 seconds) for the tracking control to be completed, but the slight change in the level of the reproduced FM video signal occurring in such a short time of 0.083 seconds cannot be detected from the reproduced picture by the human eye.

Further, the present invention is not limited to these embodiments, but various variations and modifications may be made without departing from the scope of the present invention.

What is claimed is:

1. A tracking control apparatus for a rotary recording medium reproducing apparatus, said tracking control apparatus comprising:

reproducing means including a reproducing element for reproducing a frequency modulated video signal from a rotary recording medium, said rotary recording medium being recorded with said frequency modulated video signal on concentric tracks formed on a recording surface thereof;

moving means including a motor responsive to a control signal for moving said reproducing element in a radial direction of said rotary recording medium;

extracting means for extracting a vertical blanking period portion of an output reproduced frequency modulated video signal of said reproducing means;

sample and hold means for sampling and holding a D.C. level of an output vertical blanking period portion of said extracting means and for obtaining a digital value indicative of the sampled and held D.C. level;

memory means for storing the digital value; and control means for controlling a write-in and a read-out with respect to said memory means, said control means supplying a control signal to said moving means to move said reproducing element to a plurality of positions which are mutually separated by predetermined minute quantities with respect to one track pitch and writing a plurality of digital values into said memory means which plurality of digital values are obtained from said sample and hold means when said reproducing element assumes said plurality of positions, said control means obtaining a maximum digital value from among said plurality of digital values stored in said memory means and supplying to said moving means a control signal for moving said reproducing element to a position where said maximum digital value is obtainable.

2. A tracking control apparatus as claimed in claim 1 in which said control mass initally supplies to said moving means a control signal for moving said reproducing element to a mechanically neutral position and thereafter supplies to said moving means a control signal for successively and radially moving said reproducing element in an inner and/or outer peripheral direction of said rotary recording medium from said mechanically neutral position.

3. A tracking control apparatus as claimed in claim 1 in which said rotary recording medium is a magnetic disc recorded with the frequency modulated video signal at a rate of one field per track turn, and said reproducing element is a magnetic head.

4. A tracking control apparatus as claimed in claim 1 in which said reproducing means comprises a pair of reproducing elements for alternately reproducing the frequency modulated video signal from the concentric tracks on respective recording surfaces of said rotary recording medium, and one of said reproducing element is moved over a predetermined number of track pitches over one recording surface of said rotary recording medium as the other of said reproducing element scans over a predetermined track turn on the other recording surface of said rotary recording medium.

5. A tracking control apparatus as claimed in claim 1 in which said extracting means comprises an analog switch for passing only the vertical blanking period portion of the output reproduced frequency modulated video signal of said reproducing means.

6. A tracking control apparatus as claimed in claim 5 in which said sample and hold means comprises a D.C. converter for converting an output signal of said analog switch into a D.C. signal, a sample and hold circuit for sampling and holding the output D.C. signal of said D.C. converter, and an analog-to-digital converter for subjecting an output sampled value of said sample and hold circuit to an analog-to-digital conversion.

7. A tracking control apparatus as claimed in claim 6 which further comprises pulse generating means for separating synchronizing signals from the output reproduced frequency modulated video signal of said reproducing means and for generating control pulses based on the separated synchronizing signals, and said pulse generating means supplies the control pulses to said analog switch, said sample and hold circuit, and said analog-to-digital converter so as to control the operations thereof.

8. A tracking control apparatus as claimed in claim 1 in which said control means supplies to said moving means a control signal for moving said reproducing element to said plurality of positions in steps of 3 $\mu$m to 6 $\mu$m.

9. A tracking control apparatus for a rotary recording medium reproducing apparatus, said tracking control apparatus comprising:

reproducing means including a reproducing element for reproducing a frequency modulated video signal from a rotary recording medium, said rotary recording medium being recorded with said frequency modulated video signal on a spiral track formed on a recording surface thereof;

moving means including a motor responsive to a control signal for moving said reproducing element in a radial direction of said rotary recording medium;

extracting means for extracting a vertical blanking period portion of an output reproduced frequency modulated video signal of said reproducing means;

sample and hold means for sampling and holding a D.C. level of an output vertical blanking period portion of said extracting means and for obtaining a digital value indicative of the sampled and held D.C. level;

memory means for storing the digital value and a compensation signal which is indicative of a continuous change in the radius of said spiral track in correspondence with the radial direction of said rotary recording medium; and control means for controlling a write-in and a read-out with respect to said memory means, said control means supplying a control signal to said moving means to move said reproducing element to a plurality of positions which are mutually separated by predetermined minute quantities with respect to one track pitch and writing a plurality of digital values into said memory means which plurality of digital values are obtained from said sample and hold means when said reproducing element assumes said plurality of positions, said control means obtaining a maximum digital value from among said plurality of digital values stored in said memory means by use of the compensation signal stored in said memory means and supplying to said moving means a control signal for moving said reproducing element to a position where said maximum digital value is obtainable.

* * * * *